United States Patent
Wang et al.

(10) Patent No.: US 10,141,089 B1
(45) Date of Patent: Nov. 27, 2018

(54) SURFACE-MOUNTABLE OVER-CURRENT PROTECTION DEVICE

(71) Applicant: Polytronics Technology Corp., Hsinchu (TW)

(72) Inventors: David Shau Chew Wang, Taipei (TW); Tsungmin Su, Hsinchu (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 15/827,873

(22) Filed: Nov. 30, 2017

(30) Foreign Application Priority Data

May 16, 2017 (TW) .............................. 106116192 A

(51) Int. Cl.
| | | |
|---|---|---|
| *H01C 1/14* | (2006.01) | |
| *H01C 7/02* | (2006.01) | |
| *H02H 9/02* | (2006.01) | |
| *H01C 1/034* | (2006.01) | |
| *H01C 1/16* | (2006.01) | |

(52) U.S. Cl.
CPC ............ *H01C 1/1406* (2013.01); *H01C 1/034* (2013.01); *H01C 1/16* (2013.01); *H01C 7/028* (2013.01); *H02H 9/026* (2013.01)

(58) Field of Classification Search
CPC ........ H01C 1/1406; H01C 1/034; H01C 1/16; H01C 7/028
USPC ...................................................... 338/22 R
See application file for complete search history.

(56) References Cited

U.S. PATENT DOCUMENTS

| | | | | |
|---|---|---|---|---|
| 5,777,541 A | * | 7/1998 | Vekeman | H01C 7/02 338/22 R |
| 5,818,676 A | * | 10/1998 | Gronowicz, Jr. | H01C 1/1406 361/106 |
| 6,377,467 B1 | | 4/2002 | Chu et al. | |
| 6,794,980 B2 | * | 9/2004 | Chu | H01C 3/06 338/210 |
| 7,283,033 B2 | * | 10/2007 | Wang | H01C 1/1406 338/22 R |

(Continued)

FOREIGN PATENT DOCUMENTS

| | | |
|---|---|---|
| TW | 303471 B | 4/1997 |
| TW | I557756 B | 11/2016 |

*Primary Examiner* — Kyung S Lee
(74) *Attorney, Agent, or Firm* — Muncy, Geissler, Olds & Lowe, P.C.

(57) ABSTRACT

A surface-mountable over-current protection device comprises at least one chip, a first lead and a second lead. The chip comprises a PTC material layer and two metal electrode layers disposed on upper and lower surfaces of the PTC material layer. The first lead is bent into multiple portions comprising a first electrode connecting portion connecting to one of the two metal electrode layers of the at least one chip and a first soldering portion for surface-mounting. The second lead is bent into multiple portions comprising a second electrode connecting portion connecting to another one of the two electrode layers of the at least one chip and a second soldering portion for surface-mounting. The PTC material layer comprises crystalline polymer and conductive filler dispersed therein, and the conductive filler has a resistivity less than 500μΩ·cm. The surface-mountable over-current protection device can withstand a cycle life test of 300 cycles at 20V/40A without blowout.

8 Claims, 4 Drawing Sheets

(56) References Cited

U.S. PATENT DOCUMENTS

| | | | | |
|---|---|---|---|---|
| 2004/0216914 A1* | 11/2004 | Vexler | ................... | H01B 3/441 |
| | | | | 174/121 A |
| 2011/0241818 A1* | 10/2011 | Sha | ...................... | H01C 7/027 |
| | | | | 338/22 R |
| 2014/0146432 A1* | 5/2014 | Wang | .................... | H01C 7/021 |
| | | | | 361/93.7 |
| 2016/0233667 A1* | 8/2016 | Chen | .................... | H01C 7/008 |

\* cited by examiner

SURFACE-MOUNTABLE OVER-CURRENT PROTECTION DEVICE

BACKGROUND OF THE INVENTION

(1) Field of the Invention

The present application relates to an over-current protection device, and more specifically, to a surface-mountable over-current protection device.

(2) Description of the Related Art

A positive temperature coefficient (PTC) composite material has an extremely low resistance at a normal temperature; however when an over-current or an over-temperature occurs in the circuit, the resistance instantaneously increases to a high resistance state (i.e., trip) to diminish the current for circuit protection. When the temperature decreases to room temperature or over-current no longer exists, the over-current protection device returns to low resistance state so that the circuit operates normally again. Because the PTC over-current protection devices can be reused, they can replace fuses and are widely applied to high-density circuitries.

In general, the PTC conductive composite material contains crystalline polymer and conductive filler. The conductive filler is dispersed uniformly in the crystalline polymer. The crystalline polymer is usually a polyolefin polymer such as polyethylene. The conductive filler usually contains carbon black powder. However, carbon black only exhibits low electrical conductivity and therefore cannot meet the demand of low resistivity in recent applications. Therefore, conductive filler of low resistivity such as metal or conductive ceramic powder is introduced into the PTC composite material in consideration of the lower resistivity than carbon black to make the so-called low-p over-current protection device.

The most widely used surface-mountable over-current protection device is disclosed in U.S. Pat. No. 6,377,467 as shown in FIG. 1A. The device comprises conductive through holes 11 to connect metal foils 13 on surfaces of a PTC material layer 12 and electrodes 14 on the outer surfaces of the device to form conductive paths. Insulating layers 15 are formed between the electrodes 14 and the metal foils 13. For high voltage applications, e.g., 16V or 30V, it usually decreases the amount of the conductive fillers such as carbon black or conductive ceramic powder. This however increases the resistance and decreases hold current of the device, and cannot meet the requirements of high voltage endurance and high hold current simultaneously. The surface-mountable over-current protection device is usually made through PCB process in which circuits are formed by etching. However, in the event of, for example, inaccurate positions of etching, copper foil residue due to incomplete etching or defective connections of conductive through holes, an electric arc may occur. In addition, if etchant remains after process, the ability to withstand voltages would be diminished.

SUMMARY OF THE INVENTION

To resolve the problems that the surface-mountable over-current protection device cannot withstand high voltages, the present application devised a surface-mountable over-current protection device which is of a simple structure and may not be made by a printed circuit board (PCB) process. The surface-mountable over-current protection device is endurable for high voltage and sustains low resistivity and high hold current, so as to provide high voltage, e.g., 16V, 20V, 24V, 30V or higher than 30V, and high power over-current protection. In particular, the surface-mountable over-current protection device can withstand at least 20V and at least 80 W without blowout.

In accordance with an embodiment of the present application, a surface-mountable over-current protection device comprises at least one chip, a first lead and a second lead. The chip comprises a PTC material layer and two metal electrode layers disposed on upper and lower surfaces of the PTC material layer. The first lead is bent into multiple portions comprising a first electrode connecting portion connecting to one of the two metal electrode layers of the at least one chip and a first soldering portion for surface-mounting. The second lead is bent into multiple portions comprising a second electrode connecting portion connecting to another one of the two metal electrode layers of the at least one chip and a second soldering portion for surface-mounting. The PTC material layer comprises crystalline polymer and conductive filler dispersed therein, and the conductive filler has a resistivity less than 500µΩ·cm. The surface-mountable over-current protection device can withstand a cycle life test of 300 cycles at 20V/40 A without blowout.

In an embodiment, each of the first lead and the second lead is formed integrally.

In an embodiment, at least two chips are stacked, and at least one of the first electrode connecting portion and the second electrode connecting portion comprises a commonly used electrode laminated between adjacent two chips to form a circuit in which the at least two chips are in parallel connection.

In an embodiment, the first electrode connecting portion comprises bifurcate first horizontal portion and second horizontal portion, and the first horizontal portion and second horizontal portion are in different planes.

In an embodiment, the second electrode connecting portion comprises a third horizontal portion serving as a commonly used electrode laminated between adjacent chips.

In an embodiment, the first lead further comprises a first upright portion connecting to the first electrode connecting portion and the first soldering portion, and the second lead further comprises a second upright portion connecting to the second electrode connecting portion and the second soldering portion.

In an embodiment, the surface-mountable over-current protection device further comprises an insulating layer encapsulating the at least one chip, the first and second electrode connecting portions and exposing the first and second soldering portions. Preferably, the insulating layer is flame-retardant and has water-resistant and oxygen barrier properties.

In an embodiment, the conductive filler comprises metal powder and/or conductive ceramic powder.

In an embodiment, the thickness of the metal electrode layer is 50-90 µm.

In an embodiment, the conductive filler in the PTC material layer comprises tungsten carbide and carbon black.

In an embodiment, the surface-mountable over-current protection device has a relation: $P=I_{hold} \times V_{max} \geq 80$ W, where P is an endurable power of the protection device, $I_{hold}$ is a hold current of the protection device, and $V_{max}$ is a maximum endurable voltage of the protection device.

To simplify surface-mounting, bending is substituted for a PCB process to make leads; and therefore voltage endurance is enhanced due to no etchant residues. The surface-mountable over-current protection device of the present application can withstand at least 20V without blowout. By optimizing the PTC composition, the thickness of the metal electrode layer and the size of the chip, the surface-mountable over-current protection device of the present application can withstand a voltage of 30V or 60V, and it can withstand a power of at least 80 W for 24 hours without damage.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 2A:
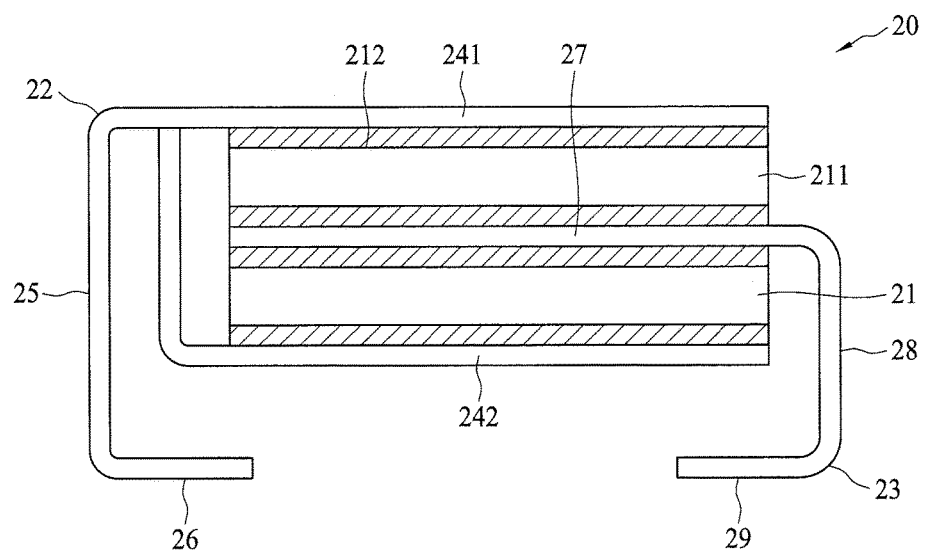
FIGS. 2A and 2B show a surface-mountable over-current protection device in accordance with an embodiment of the present application.
Figure 2B:
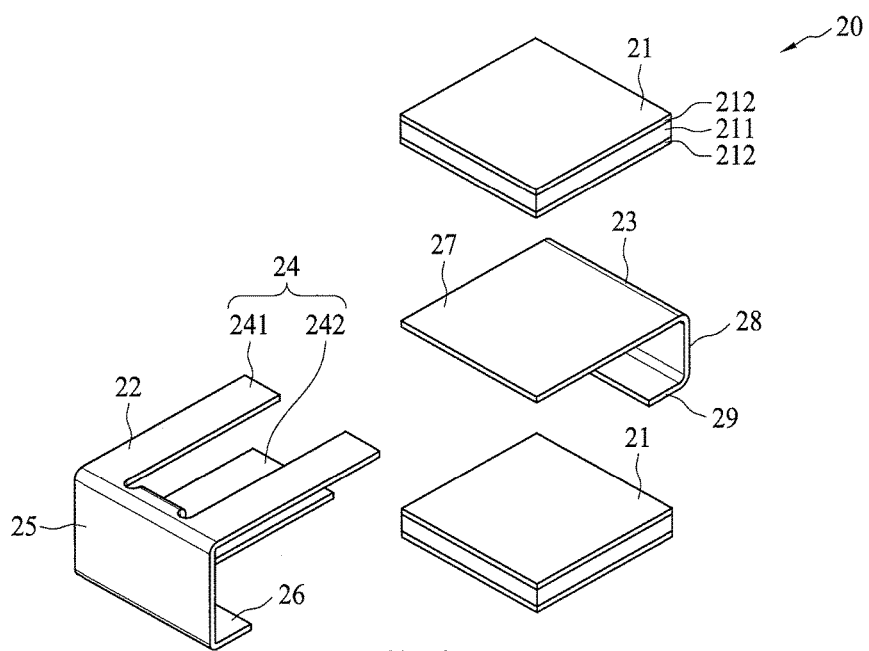

FIGS. 2A and 2B show a surface-mountable over-current protection device 20 in accordance with an embodiment of the present application. FIG. 2A is a side view of the over-current protection device 20, and FIG. 2B is an exploded view of the over-current protection device 20. The surface-mountable over-current protection device 20 comprises two chips 21, a first lead 22 and a second lead 23 in which the two chips 21 are stacked. In an embodiment, the chip 21 is a laminated structure comprising a PTC material layer 211 and metal electrode layers 212 disposed on upper and lower surfaces of the PTC material layer 211. The first lead 22 and the second lead 23 are structures flexed into plural portions including, but not limited to, horizontal portions and upright portions. In an embodiment, each of the first lead 22 and the second lead 23 is formed integrally; for example, it is bent from a metal sheet. First, the metal sheet can be punched to form comb-like electrodes comprising a plurality of first leads 22 and a plurality of second leads 23. The comb-like electrodes are combined with the chips 21 and are flexed and cut thereafter to form a plurality of surface-mountable over-current protection devices 20. Each of the chips 21 has a metal electrode layer 212 connecting to a first lead 22 for electrical conduction and another metal electrode layer 212 connecting to a second lead 23 for electrical conduction. In an embodiment, an end of the second lead 23 is a horizontal portion sandwiched between the two chips 21 as a commonly used electrode, and accordingly the two chips 21 are in parallel connection.

In an embodiment, the first lead 22 comprises a first electrode connecting portion 24, a first upright portion 25 and a first soldering portion 26. The first electrode connecting portion 24 and the first soldering portion 26 extend horizontally, and the first upright portion 25 extends vertically and connects to the first electrode connecting portion 24 and the first soldering portion 26. The first electrode connecting portion 24 connects to a metal electrode layer 212 of each of the chips 21, and the first soldering portion 26 serves as an interface for surface-mounting. In this embodiment, the first electrode connecting portion 24 contains a first horizontal portion 241 and a second horizontal portion 242. The first horizontal portion 241 is diverged from the second horizontal portion 242 and they are placed in different planes. The first horizontal portion 241 comprises two electrode stripes disposed on upper surface and in direct contact with a top surface of the upper chip 21. The second horizontal portion 242 is bifurcated from the first horizontal portion 241, and is in direct contact with the center of the underside of the lower chip 21. The second horizontal portion 242 and the first horizontal portion 241 may be made of a single sheet such as a nickel sheet or a copper sheet which is cut along two lines and bent. The first horizontal portion 241 and the second horizontal portion 242 have approximately equivalent areas. In other words, the area of the first horizontal portion 241 having two electrode stripes is approximately equivalent to the area of the second horizontal portion 242, so as to provide equivalent effective electrode area. For example, the width of each electrode stripe of the first horizontal portion 241 is about 0.75 mm, and the width of the second horizontal portion 242 is about 1.5 mm, so as to provide equivalent effective electrode areas for upper and lower chips 21. Alternatively, a metal sheet may be cut along a middle line and then is flexed to form bifurcate first and second horizontal portions with same widths. For example, both widths of the first and second horizontal portions are 1.5 mm so as to provide equivalent effective electrode areas.

The second lead 23 comprises a second electrode connecting portion 27, a second upright portion 28 and a second soldering portion 29. The second electrode connecting portion 27 serving as a third horizontal portion connects to another metal electrode layers 212 of the upper and lower chips 21, and the second upright portion 28 connects the second electrode connecting portion 27 and the second soldering portion 29. The second electrode connecting portion 27 is in direct contact with the metal electrode layers 212 facing each other of the upper and lower chips 21. In other words, the second electrode connecting portion 27 is sandwiched between adjacent metal electrode layers 212 of the upper and lower chips 21 to be an electrode commonly used by the two chips 21. The first soldering portion 26 and the second soldering portion 29 are flexed inwardly to be placed in a same plane so as to serve as interfaces for surface-mounting to a circuit board. More specifically, the first soldering portion 26 is flexed from the first upright portion 25 toward the chips 21 and the second soldering 29 is flexed from the second upright portion 28 toward the chips 21. The flexed directions of the soldering portions are not limited to this embodiment and may vary as desired.

Figure 3:
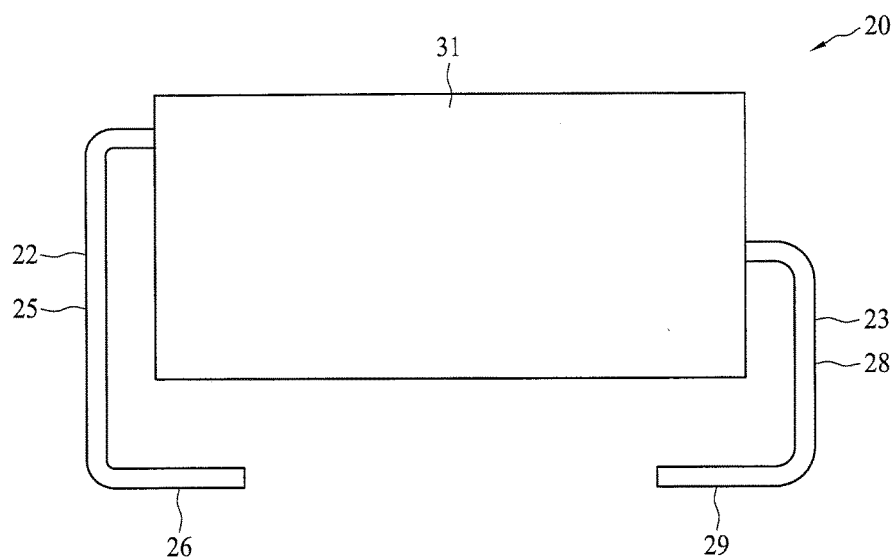
FIG. 3 shows a surface-mountable over-current protection device in accordance with another embodiment of the present application.

In FIG. 3, to prevent unexpected short-circuit problems of the first lead 22 and the second lead 23, the surface-mountable over-current protection device 20 may further comprise an insulating layer 31. The insulating layer 31 encapsulates at least the chips 21 and partial first lead 22 and second lead 23, and in particular encapsulates the first electrode connecting portion 24 and the second electrode connecting portion 27 and at least expose the first soldering portion 26 and the second soldering portion 29 for surface-mounting. The insulating layer 31 may comprise thermo-setting polymer endurable to high temperature in sequential reflow soldering process. The insulating layer 31 may contain heat conductive material to obtain better heat dissipation for the chips 21 and higher hold current value. The heat conductivity of the insulating layer 31 may be equal to or greater than 1 W/m·K, 2 W/m·K, or 4 W/m·K if desired. The insulating layer 31 may be made by mold injection, spraying, or encapsulating heat-conductive and insulating material. In addition to insulation, the insulating layer 31 may be flame-retardant and have water-resistant and oxygen barrier properties.

The PTC material layer 211 comprises crystalline polymer and conductive filler dispersed therein. The crystalline polymer usually comprises polyolefin polymer such as polyethylene. The conductive filler may be carbon black, metal or conductive ceramic powder. Carbon black is cheap but its resistivity is high. Metal and conductive ceramic powder has lower resistivity and is suitable for device miniaturization and low resistance applications. The particle size of the conductive filler is 0.01-30 μm. The metal powder may comprise nickel, cobalt, copper, iron, tin, lead, silver, gold, platinum or alloy thereof. The conductive ceramic powder may comprise metal carbide, e.g., titanium carbide, tungsten carbide, vanadium carbide, zirconium carbide, niobium carbide, tantalum carbide, molybdenum carbide and hafnium carbide; metal boride, e.g., titanium boride, vanadium boride, zirconium boride, niobium boride, molybdenum boride, hafnium boride; or metal nitride, e.g., zirconium nitride, and combinations thereof, e.g., mixture, solid solution or core-shell.

Figure 4:
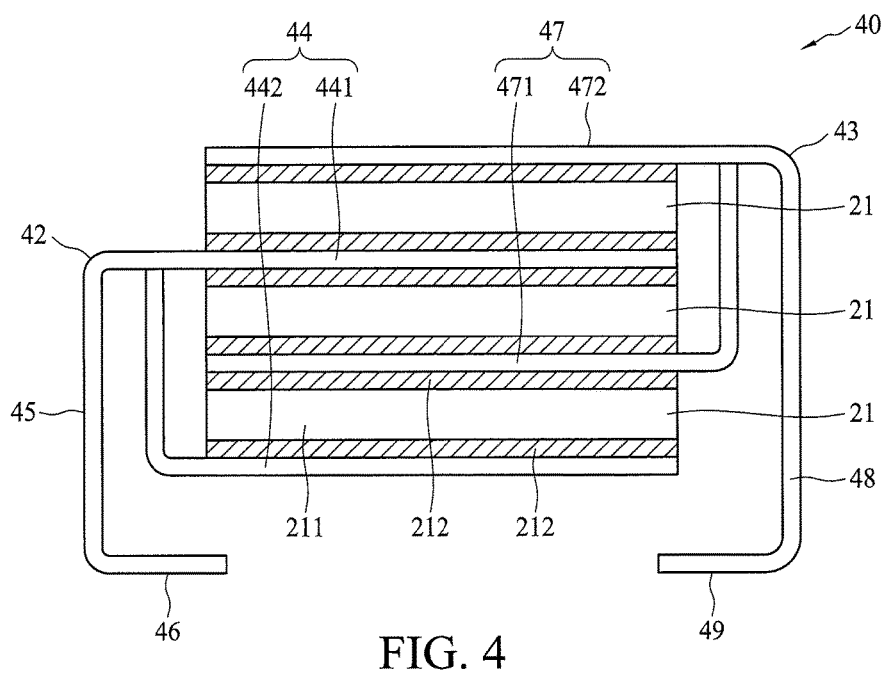
FIG. 4 shows a surface-mountable over-current protection device in accordance with yet another embodiment of the present application.

In addition to the aforesaid embodiment with two chips, the present application can be applied to more chips in parallel connection. FIG. 4 shows a surface-mountable over-current protection device 40 comprising three chips 21, a first lead 42 and a second lead 43. More chips in parallel connection can further decrease the resistance of the device. In this embodiment, each chip 21 comprises a PTC material layer 211 and metal electrode layers 212 attached to upper and lower surfaces of the PTC material layer 211. The first lead 42 and the second lead 43 are bent to plural portions. It is preferable to integrally form the first lead 42 and/or the second lead 43; for example, it is made of a single metal sheet. Each chip 21 has a metal electrode layer 212 connecting to the first lead 42 for electrical conduction, and another metal electrode layer 212 connecting to is the second lead 43 for electrical conduction. The first lead 42 comprises a first electrode connecting portion 44, a first upright portion 45 and a first soldering portion 46. The first electrode connecting portion 44 and the first soldering portion 46 extend horizontally, and the first upright portion 45 connects to the first electrode connecting portion 44 and the first soldering portion 46. The first electrode connecting portion 44 connects to a metal electrode layer 212 of each chip 21, and the first soldering portion 46 serves as an interface for surface-mounting. In this embodiment, the first electrode connecting portion 44 comprises bifurcate first horizontal portion 441 and second horizontal portion 442 in different planes. The first horizontal portion 441 is sandwiched between adjacent chips 21 as a commonly used electrode, and the second horizontal portion 442 connects to the lower metal electrode layer 212 of the bottommost chip 21. The second lead 43 comprises a second electrode connecting portion 47, a second upright portion 48 and a second soldering portion 49. The second electrode connecting portion 47 comprises bifurcate third horizontal portion 471 and fourth horizontal portion 472, and the third horizontal portion 471 and the fourth horizontal portion 472 are placed in different planes. The third horizontal portion 471 is laminated between adjacent chips 21 as a commonly used electrode, and the fourth horizontal portion 472 connects to the metal electrode layer 212 of the uppermost chip 21. In this embodiment, both the first horizontal portion 441 of the first lead 42 and the third horizontal portion 471 of the second lead 43 are electrodes commonly used for adjacent chips 21, and accordingly the three chips 21 are in parallel connection after connecting to the first lead 42 and the second lead 43. Similarly, a surface-mountable over-current protection device with more chips in parallel connection can be made accordingly to further decrease its resistance.

Figure 5:
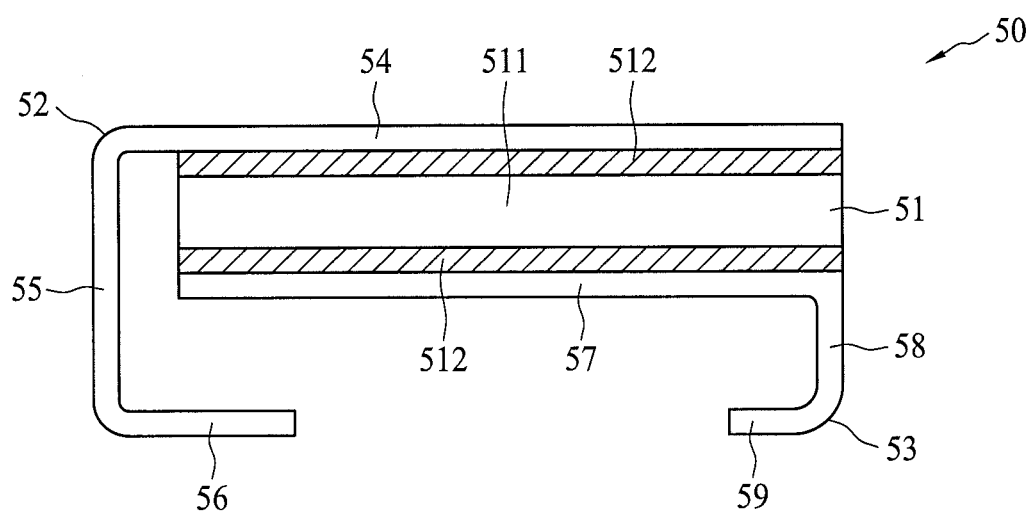
FIG. 5 shows a surface-mountable over-current protection in accordance with still another embodiment of the present application.

The flexed design can be applied to a single chip as shown in FIG. 5. A surface-mountable over-current protection device 50 comprises a chip 51, a first lead 52 and a second lead 53. In this embodiment, the chip 51 comprises a PTC material layer 511 and metal electrode layers 512 disposed on upper and lower surfaces of the PTC material layer 511. The first lead 52 and the second lead 53 are flexed into plural portions including, but not limited to, horizontal and upright portions. The chip 51 has a metal electrode layer 512 connecting to the first lead 52 for electrical conduction, and another metal electrode layer 512 connecting to the second lead 53 for electrical conduction. In this embodiment, the first lead 52 is integrally formed and comprises a first electrode connecting portion 54, a first upright portion 55 and a first soldering portion 56. The first electrode connecting portion 54 connects to an upper metal electrode layer 512 of the chip 51. The first soldering portion 56 serves as an interface for surface-mounting to a circuit board, and the first upright portion 55 connects to the first electrode connecting portion 54 and the first soldering portion 56. The second lead 53 is integrally formed and comprises a second electrode connecting portion 57, a second upright portion 58 and a second soldering portion 59. The second electrode connecting portion 57 connects to a lower metal electrode layer 512, and the second soldering portion 59 serves as an interface for surface-mounting to a circuit board, and the second upright portion 58 connects to the second electrode connecting portion 57 and the second soldering portion 59.

Figure 1A:
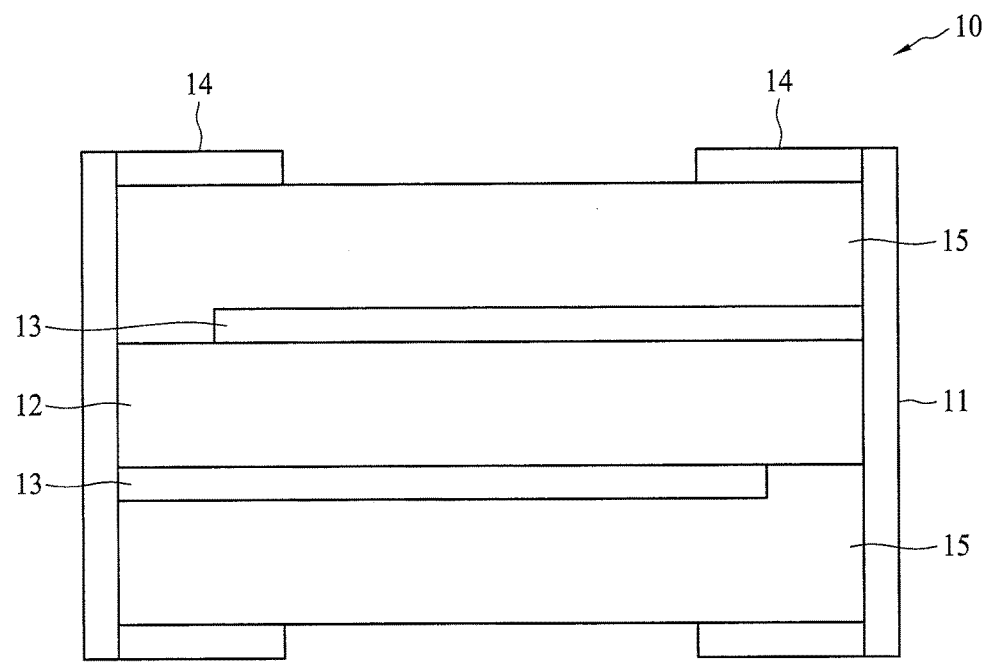
FIGS. 1A and 1B show known surface-mountable over-current protection devices of a single PTC material layer and two PTC material layers, respectively.
Figure 1B:
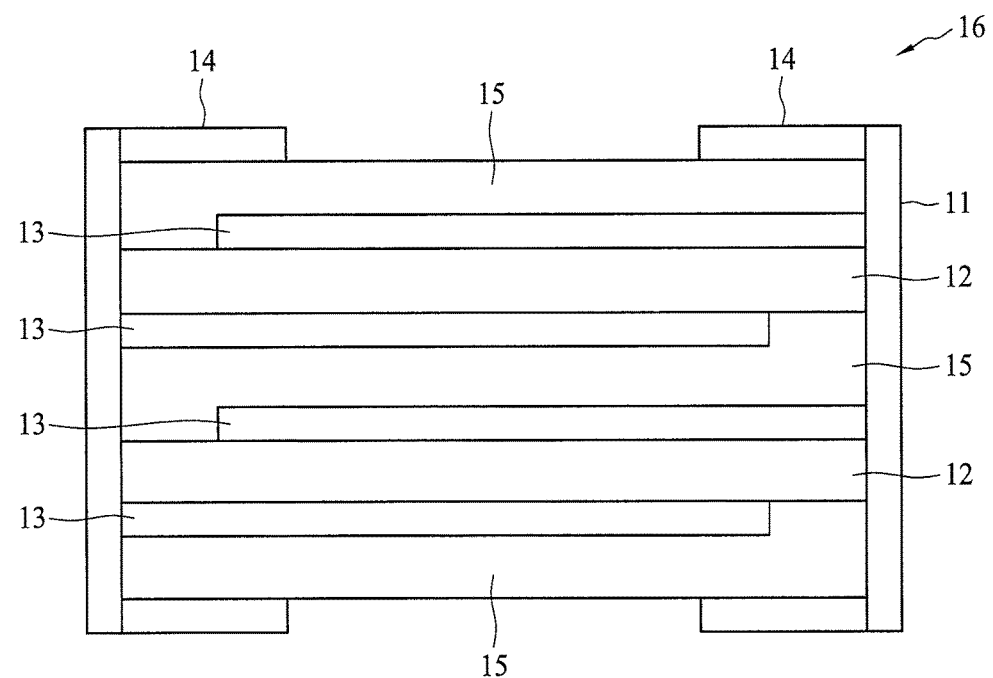

The surface-mountable over-current protection device of FIG. 2A and FIG. 2B and the traditional device in FIG. 1B are subjected to cycle life tests as shown in Table 1. Both devices are of the size 2920 and use same PTC material in which the conductive filler is a mixture of tungsten carbide and carbon black. The metal electrode layers on the PTC material layer use 2 oz copper foils. i.e., copper foil of 70 μm in thickness. The metal electrode layer cannot be too thin, and its thickness is 50-90 μm, e.g., 60 μm, 70 μm, or 80 μm. The cycle life tests undergo at 30V and 40 A, and Table 1 shows resistances after different trip times or cycle times. Ri is an initial resistance of the device, $R_1$, $R_{10}$, $R_{50}$, $R_{100}$, $R_{200}$ and $R_{300}$ are the resistances measured at one hour after 1 cycle, 10 cycles, 50 cycles, 100 cycles, 200 cycles and 300 cycles, respectively. The surface-mountable over-current protection device of the present application can pass the cycle life test of 300 cycles without blowout; however the traditional device fails and is blown in the cycle life test of 300 cycles. It appears that the device of the present application has higher voltage endurance in comparison with the traditional device.

TABLE 1

| | 30 V/40 A | | | | | | |
|---|---|---|---|---|---|---|---|
| | $R_i$ | $R_1$ | $R_{10}$ | $R_{50}$ | $R_{100}$ | $R_{200}$ | $R_{300}$ |
| The present application | 0.0036 | 0.0034 | 0.0038 | 0.0051 | 0.0066 | 0.0085 | 0.0109 |
| Traditional | 0.0106 | 0.0111 | 0.0129 | 0.0167 | 0.0309 | 0.0294 | blow-out |

Table 2 shows electric tests of the devices of the present application and the traditional devices. As shown in FIG. 2A and FIG. 2B, the device of Em 1 to Em 5 is a surface-mountable over-current protection device containing two chips from small size of a form factor 1812 (0.18"×0.12"), 2016 (0.2"×0.16") to 2920 (0.29"×0.2"). The conductive filler of the PTC material layer comprises a mixture of tungsten carbide and carbon black, the metal electrode layers on the PTC material layer use 2 oz copper foils, and the leads connecting to the metal electrode layers are nickel plates. Comp 1, Comp 2 and Comp 3 are traditional surface-mountable over-current protection devices of different sizes as shown in FIG. 1B, and they compare with Em 1 to Em 5 for electric tests. The devices undergo cycle life test at 16V/40 A, 20V/40 A, 24V/40 A by 300 cycles, each cycle including trip and recovery. In a cycle, the voltage and current are applied to the devices for 10 seconds and turn off for 60 seconds. The traditional devices pass 16V tests, and however are blown in 20V and 24V tests. The devices of the present application can pass all the cycle life tests at 16V, 20V and 24V. In trip endurance tests, the devices undergoing a voltage and a current for a specific time period, at 20V/40 A for 168 hours, all the traditional devices are blown and the devices of the present application can pass the tests at 24V and 30V. The surface-mountable over-current protection devices of the present application can withstand a maximum endurable voltage $V_{max} \geq 20V$. $V_{max}$ of the traditional devices do not exceed 20V, and therefore the devices are used for low voltage applications only. The devices of the present application can withstand $V_{max}$ greater than 20V and a hold current $I_{hold}$ for 24 hours without blowout, and thus they pass the tests of at least 80 W for 24 hours. In summary, the surface-mountable over-current protection device of the present application has a relation: $P = I_{hold} \times V_{max} \geq 80$ W, where P is an endurable power of the over-current protection device, $I_{hold}$ is a hold current of the over-current protection device, and $V_{max}$ is a maximum endurable voltage of the over-current protection device. The device of the present application can operate normally at a power of at least 80 W.

The surface-mountable over-current protection device of the present application has not only a simple structure but also a simple manufacturing process. It need not lateral conductive through holes of a traditional device nor a PCB process. Therefore, the device of the present application does not incur connecting defects between the electrodes and the conductive through holes nor insufficient voltage endurance or electric arc caused by etchant residue. The voltage endurance varies upon the area of the PTC chip, the thickness of the PTC material layer, the thickness of the copper foils, and the resistivity of the PTC composition. According to the cycle life tests of different voltages, the traditional devices withstand 16V only; however the devices of the present application withstand at least 20V, and may withstand 30V or 60V. In summary, the surface-mountable over-current protection device of the present application can withstand at least a voltage of 20V and a power of 80 W, and the device can pass the cycle test of 300 cycles at 20V/40 A without blowout.

The above-described embodiments of the present invention are intended to be illustrative only. Numerous alternative embodiments may be devised by persons skilled in the art without departing from the scope of the following claims.

What is claimed is:

1. A surface-mountable over-current protection device, comprising:
   at least one chip, the chip comprising a PTC material layer and two metal electrode layers disposed on upper and lower surfaces of the PTC material layer;
   a first lead bent into multiple portions comprising a first electrode connecting portion connecting to one of the two metal electrode layers of the at least one chip and a first soldering portion for surface-mounting;
   a second lead bent into multiple portions comprising a second electrode connecting portion connecting to another one of the two electrode layers of the at least one chip and a second soldering portion for surface-mounting;
   wherein the PTC material layer comprises crystalline polymer and conductive filler dispersed therein, the conductive filler has a resistivity less than 500μΩ·cm;
   wherein the metal electrode layer has a thickness of 50-90 μm;
   wherein the conductive filler comprises tungsten carbide and carbon black;
   wherein surface-mountable over-current protection device has a relation: $P = I_{hold} \times V_{max} \geq 80$ W, where P is an endurable power of the protection device, $I_{hold}$ is a hold current of the protection device, and $V_{max}$ is a maximum endurable voltage of the protection device;

TABLE 2

| | Size | Structure | | | Cycle life test (300 cycles) | | | Trip Endu.(168 hr) | | | $I_{hold} \times V_{max}$ |
|---|---|---|---|---|---|---|---|---|---|---|---|
| | 16 V/ 40 A | 20 V/ 40 A | 24 V/ 40 A | $R_i$ (mΩ) | $I_{hold}$ (A) | 16 V/ 40/ A | 20 V/ 40 A | 24 V/ 40/A | test conditon | R (mΩ) | $V_{max}$ (V) | $V_{max}$ (W) |
| Em 1 | 1812 | FIG. 2A | | 8.4 | 3.5 | pass | pass | pass | 24 V/40 A | 16.8 | 24 | 84 |
| Em 2 | 2016 | FIG. 2A | | 4.7 | 4 | pass | pass | pass | 30 V/40 A | 11.9 | 30 | 120 |
| Em 3 | 2016 | FIG. 2A | | 3.6 | 5 | pass | pass | pass | 24 V/40 A | 9.3 | 24 | 120 |
| Em 4 | 2920 | FIG. 2A | | 4.2 | 5 | pass | pass | pass | 30 V/40 A | 11.2 | 30 | 150 |
| Em 5 | 2920 | FIG. 2A | | 3 | 7.5 | pass | pass | pass | 24 V/40 A | 12.3 | 24 | 180 |
| Comp 1 | 1812 | FIG. 1B | | 8.3 | 3.5 | pass | fail | fail | 20 V/40 A | Fail | 16 | 56 |
| Comp 2 | 2016 | FIG. 1B | | 6.4 | 4.5 | pass | fail | fail | 20 V/40 A | Fail | 16 | 72 |
| Comp 3 | 2920 | FIG. 1B | | 3.6 | 6 | pass | fail | fail | 20 V/40 A | Fail | 16 | 96 | wherein the surface-mountable over-current protection device can withstand a cycle life test of 300 cycles at 20V and 40 A without burnout.

2. The surface-mountable over-current protection device of claim 1,
wherein each of the first lead and the second lead is integrally formed.

3. The surface-mountable over-current protection device of claim 1, wherein at least two chips are stacked, and at least one of the first electrode connecting portion and the second electrode connecting portion comprises a commonly used electrode laminated between adjacent two chips to form a circuit in which the at least two chips are in parallel connection.

4. The surface-mountable over-current protection device of claim 3, wherein the first electrode connecting portion comprises bifurcate first horizontal portion and second horizontal portion disposed in different planes.

5. The surface-mountable over-current protection device of claim 4, wherein the second electrode connecting portion comprises a third horizontal portion serving as a commonly used electrode laminated between adjacent chips.

6. The surface-mountable over-current protection device of claim 1, wherein the first lead further comprises a first upright portion connecting to the first electrode connecting portion and the first soldering portion, and the second lead further comprises a second upright portion connecting to the second electrode connecting portion and the second soldering portion.

7. The surface-mountable over-current protection device of claim 1, further comprising an insulating layer encapsulating the at least one chip, the first electrode connecting portion and the second electrode connecting portion and exposing the first soldering portion and the second soldering portion.

8. The surface-mountable over-current protection device of claim 7, wherein the insulating layer is flame-retardant and has water-resistant and oxygen barrier properties.

* * * * *